United States Patent Office.

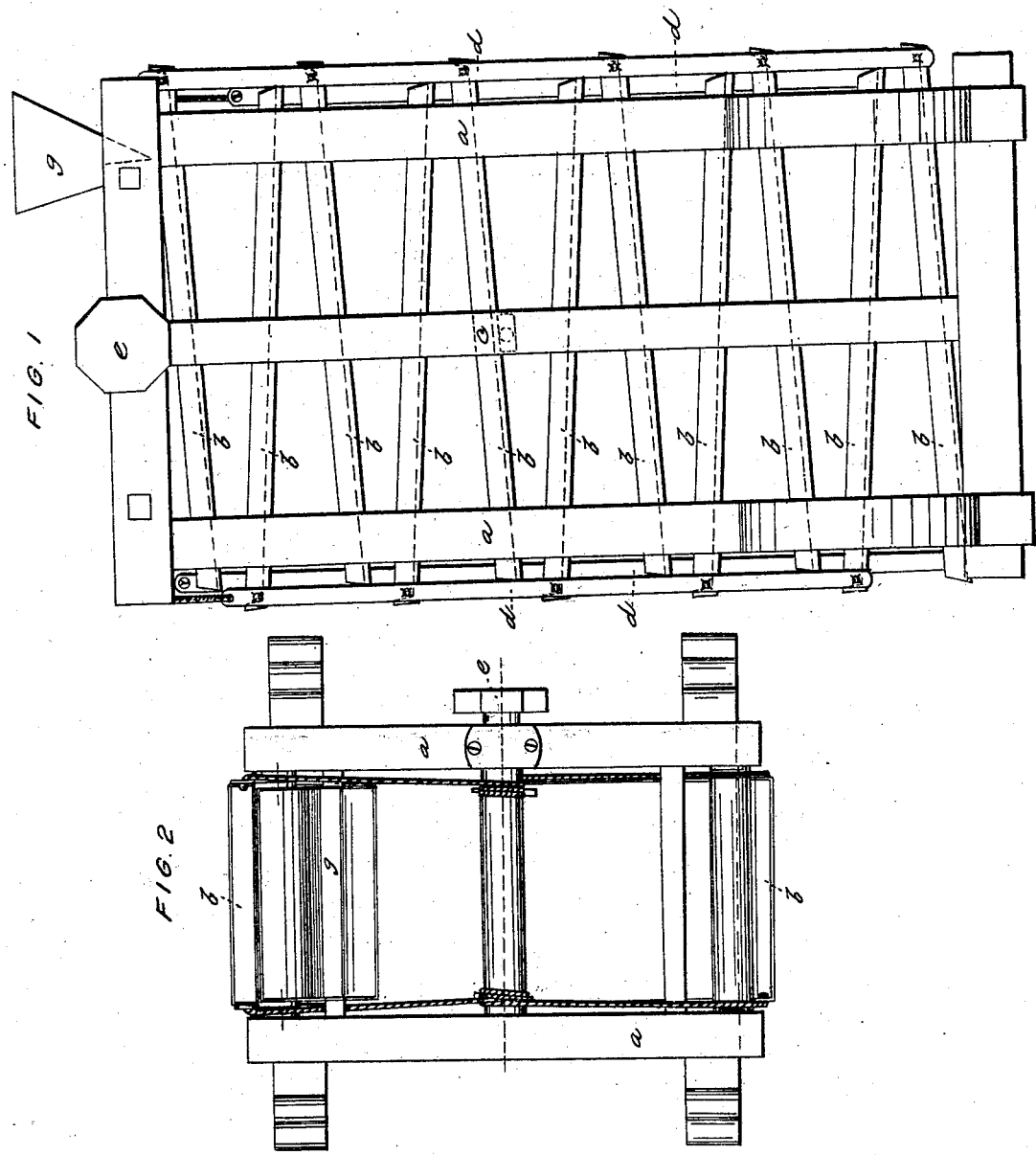

RUFUS WATSON AND THOMAS SPENCER, OF CENTRAL COLLEGE, OHIO.

Letters Patent No. 65,848, dated June 18, 1867.

---

IMPROVEMENT IN THE MANUFACTURE OF SORGHUM SUGAR.

---

The Schedule referred to in these Letters Patent and making part of the same.

---

TO ALL WHOM IT MAY CONCERN:

Be it known that we, RUFUS WATSON and THOMAS SPENCER, of Central College, in the county of Franklin, in the State of Ohio, have invented a new and improved Mode of Constructing a Machine for Granulating Sorghum Sugar; and we do hereby declare that the following is a full and exact description thereof, reference being had to the accompanying drawings, and the letters of reference marked thereon.

The nature of our invention consists in the arrangement of a series of shelves so arranged that the sirup or molasses can be run into the upper shelf in a narrow stream about the width of the upper shelf, the said shelves being inclined in such a manner that the molasses will run down from one shelf to the other, passing the entire length of each shelf, and in its passage becomes thick and grained, and will need the assistance of a hoe or scraper on the lower shelves when it is discharged.

To enable others skilled in the art to make and use our invention, we will proceed to describe its construction.

Figure 1 is a side elevation.

Figure 2 is a top view.

Letter $a$ represents the frame, constructed of wood or any suitable material. Letter $b$ represents the shelves, which are constructed of sheet iron, and lined inside with wood. $c$ represents the cross-piece or bearing for the shelves, which has a journal at each end, so arranged that the shelves can be adjusted to any desired incline. $d$ represents the rods, four in number, which are pivoted to the ends of the shelves. $e$ represents a hub and shaft, which the cords are attached to, and so arranged that by rotating the said shaft either ends of the shelves can be raised or lowered. $g$ represents the hopper or funnel used for distributing the molasses upon the upper shelves.

This machine is intended to be used in a room warmed by steam, or otherwise, to a suitable temperature that the molasses will flow freely.

In order to complete the process of making the sugar it is necessary to put the granulated sugar, after it has passed through the granulator, into a sack, and put it into the hot-press, (on which we have made application for a patent,) or some other suitable machine for the purpose, and press out the gum and acids, and the sugar remaining in the sack will be dry and fit for use.

1. We claim the herein-described process of granulating sirup. The said process consists in having the sirup flow over a shelf or shelves, or their equivalent, of suitable length and inclination so as to effect granulation, substantially as described.

2. We claim the apparatus constructed substantially as herein described for the purpose set forth.

RUFUS WATSON,
THOMAS SPENCER.

Witnesses:
HENRY C. SERGEANT,
W. G. BAKER.